United States Patent
Paulus et al.

(10) Patent No.: US 10,768,399 B2
(45) Date of Patent: Sep. 8, 2020

(54) MIRROR DEVICE

(71) Applicant: Leica Microsystems CMS GmbH, Wetzlar (DE)

(72) Inventors: Ingo Paulus, Hohenahr-Erda (DE); Sebastian Hitzler, Leun-Biskirchen (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 347 days.

(21) Appl. No.: 15/513,087

(22) PCT Filed: Sep. 25, 2015

(86) PCT No.: PCT/EP2015/072144
§ 371 (c)(1),
(2) Date: Mar. 21, 2017

(87) PCT Pub. No.: WO2016/046384
PCT Pub. Date: Mar. 31, 2016

(65) Prior Publication Data
US 2017/0293131 A1   Oct. 12, 2017

(30) Foreign Application Priority Data

Sep. 25, 2014   (DE) .......... 10 2014 113 939
Sep. 3, 2015   (DE) .......... 10 2015 114 756

(51) Int. Cl.
*G02B 21/00* (2006.01)
*G02B 21/06* (2006.01)
(Continued)

(52) U.S. Cl.
CPC .......... *G02B 21/06* (2013.01); *G02B 7/182* (2013.01); *G02B 21/362* (2013.01)

(58) Field of Classification Search
CPC ........ G02B 7/182; G02B 7/1822–1825; G02B 21/0032; G02B 21/04; G02B 21/06–125
(Continued)

(56) References Cited

U.S. PATENT DOCUMENTS 2,741,153 A    4/1956   Reason et al.
4,714,327 A *  12/1987  Marshall ............... G02B 21/18
                                                    359/364
(Continued)

FOREIGN PATENT DOCUMENTS

CN    102890321 A    1/2013
DE    3427592 A1     2/1986
(Continued)

OTHER PUBLICATIONS

International Search Report from PCT/EP2015/072144, filed Sep. 25, 2015, dated Dec. 11, 2015.
(Continued)

*Primary Examiner* — Thong Q Nguyen
(74) *Attorney, Agent, or Firm* — Patentbar International, P.C.

(57) ABSTRACT

The invention relates to a mirror device for deflecting illuminating light in SPIM microscopy. The invention is characterized by a holding component that comprises a connecting element for mounting the holding component on a microscope objective, at least one deflection mirror being detachably mounted on the holding component.

19 Claims, 10 Drawing Sheets

(51) Int. Cl.
*G02B 7/182* (2006.01)
*G02B 21/36* (2006.01)

(58) Field of Classification Search
USPC ........ 359/385–390, 798–801, 818, 850, 855, 359/871–876, 881
See application file for complete search history.

(56) References Cited

U.S. PATENT DOCUMENTS

| | | | | |
|---|---|---|---|---|
| 5,253,106 | A * | 10/1993 | Hazard | G02B 21/18 359/368 |
| 5,856,874 | A * | 1/1999 | Tachibana | G01B 11/007 356/613 |
| 6,179,439 | B1 * | 1/2001 | Choate | G01N 21/8806 359/387 |
| 6,819,411 | B1 * | 11/2004 | Sharpe | G01N 21/49 356/72 |
| 9,709,788 | B2 * | 7/2017 | Schumann | G02B 21/18 |
| 2003/0231316 | A1 * | 12/2003 | Lenz | G01N 21/8806 356/609 |
| 2005/0063058 | A1 * | 3/2005 | Langley | G02B 21/0012 359/510 |
| 2013/0107358 | A1 * | 5/2013 | Knebel | G02B 21/0032 359/385 |
| 2016/0048012 | A1 * | 2/2016 | Knebel | G02B 21/367 359/385 |
| 2016/0153892 | A1 * | 6/2016 | Knebel | G02B 21/34 359/385 |

FOREIGN PATENT DOCUMENTS

| | | |
|---|---|---|
| DE | 10257423 A1 | 6/2004 |
| DE | 102004034957 A1 | 2/2006 |
| DE | 202011110077 U1 | 11/2012 |
| DE | 102012214568 A1 | 2/2014 |
| JP | 2006337074 A | 12/2006 |
| JP | 2007017699 A | 1/2007 |
| JP | 2013097380 A | 5/2013 |
| WO | 2014/026683 A1 | 2/2014 |

OTHER PUBLICATIONS

Lindek et al.; Single-lens theta microscopy: Resolution, efficiency and working distance, Journal of modern optics, 1999, pp. 843-858, vol. 46, No. 5.

* cited by examiner

MIRROR DEVICE

RELATED APPLICATIONS

This Application is a U.S. National Stage Under 35 USC § 371 of International Application PCT/EP2015/072144, filed on Sep. 25, 2015, which in turn claims priority to German Patent Applications DE 10 2014 113 939.9, filed Sep. 25, 2014 and DE 10 2015 114 756.4, filed Sep. 3, 2015, all of which are incorporated herein by reference in their entirety.

FIELD OF THE INVENTION

The invention relates to a mirror device for deflecting illuminating light in SPIM microscopy.

The invention further relates to an optical apparatus, an arrangement for illuminating a sample in SPIM microscopy, and a microscope having such a mirror device.

BACKGROUND OF THE INVENTION

The single plane illumination microscopy (SPIM) technique, in which illumination of the sample occurs in layers, allows faster capture of image data with less sample impact than, for example, with spot scanning of a sample. One known area of application of SPIM technology is the field of fluorescence microscopy, in which fluorophores in the sample are excited with laser light. In SPIM technology, excitation takes place here only in a plane through which a sheet of illuminating light (also called a "light band") is passed. Damage to the sample due to illuminating light in other planes is thereby avoided.

A microscope operating on the SPIM principle (selective plane illumination microscope) is described, for example, in Lindek et al., Journal of Modern Optics, 1999, Vol. 46, No. 5, 843-858.

An optical apparatus operating in accordance with the SPIM method is described in DE 102 57 423 A1. With this microscope, a sample is illuminated with a thin light band while observation occurs perpendicularly to the plane of the illuminating light band. Here illumination and detection occur via two separate optical beam paths each having a separate optical system, in particular having two separate, mutually perpendicular objectives. The light band is generated by an illumination objective and by a cylindrical optic placed in front of it. For image acquisition, the sample is moved through the light band (which is stationary relative to the detector) in order to acquire fluorescent light and/or scattered light in layers using a planar detector. The layer image data thereby obtained can then be assembled into a data set corresponding to a three-dimensional image of the sample. This document does not disclose manipulation of a sample.

DE 10 2004 034 957 A1 discloses an arrangement for microscopic observation of a sample via a microscope objective in whose housing, outside the lens optic, light guides for the light illuminating the sample are provided. The illuminating light firstly proceeds parallel to the optical axis of the objective inside the light guide and then strikes small-aperture reflectors, attached to the objective housing, which focus the illuminating light with the aid of additional imaging elements, perpendicularly to the optical axis of the microscope objective and thus perpendicularly to the observation direction, into the sample. Here as well, the sample is illuminated in planar fashion using the SPIM principle. The utilization of a microscope objective configured in this fashion does allow elimination of the use of a further objective for the illuminating light. The specific configuration of this special objective, however, with additional light guides and reflectors, is technically very complex and costly.

DE 20 2011 110 077 U1 discloses an arrangement for illuminating a sample in the context of SPIM microscopy. The arrangement comprises a light source for generating a light bundle, means for generating a light band from the light bundle, and at least one objective which comprises an optic that is configured and intended to deliver detected light, proceeding from the sample, directly or indirectly to a detector. The arrangement furthermore comprises a deflection device, downstream from the optic of the objective, for deflecting the light band.

Deflection devices of this kind have so far been laboriously manufactured in one piece, and are usually mounted in very cumbersome fashion. In particular, the deflection devices so far manufactured are usually manufactured using very complex production methods that are not suitable for series production.

SUMMARY OF THE INVENTION

The object of the present invention is therefore to describe a mirror device of the kind recited previously which can be easily, flexibly, and reliably handled and which moreover is easy to manufacture, in particular including with series production methods.

The object is achieved by a mirror device that is characterized by a holding component that comprises a connecting element for mounting the holding component on a microscope objective, at least one deflection mirror being detachably mounted on the holding component.

The mirror device according to the present invention has the very particular advantage that it can be mounted in simple and reliable fashion on a microscope objective and/or in an optical arrangement for illuminating a sample. In particular, the mirror device according to the present invention has the advantage that no large additional stand parts, which would project from outside into the sample region and themselves take away space, are necessary in order to hold the deflection mirror. In addition, placement on the objective or on the further objective ensures great stability, since the objectives themselves must already be held in stable fashion.

The mirror device according to the present invention furthermore has the very particular ad vantage that its essential components can be manufactured independently of one another in accordance with the respective specific requirements for them. For example, it is even possible to use deflection mirrors having particular mirror surfaces, for example a dielectric mirror surface, which is largely impossible with one-piece manufacture.

The mirror device according to the present invention furthermore has the advantage that it can very easily be cleaned once disassembled into individual parts, for example in order to remove nutrient media and/or immersion oil.

A very particular advantage of the mirror device according to the present invention is that depending on the requirements of the experiment and/or depending on the nature of the method to be investigated and/or depending on the investigation method selected, the deflection mirror that is suitable therefor can be put into service simply, efficiently, and reliably.

In particular, it is even possible to use several deflection mirrors simultaneously, the user being capable of individually combining the types of deflection mirrors used.

In a particular embodiment, the holding component is of annular configuration. In particular, provision can advantageously be made in this context that the holding component is configured and intended to be mounted, in terms of its axial direction, on a microscope objective coaxially with the optical axis. Such an embodiment can be configured, in particular, in such a way that the annular holding component is mounted, in particular bolted on, in the front region of a microscope objective, in particular on the objective housing.

The connecting element can be embodied in a wide variety of ways. In particular, provision can advantageously be made that the connecting element is configured and intended to interact with a mating connecting element of the microscope objective, in particular with a mating connecting element of the objective housing, in order to mount the mirror device on the microscope objective.

Particularly advantageously, the connecting element can comprise, for example, a thread, in particular an internal thread, that is configured and intended to form a threaded connection with a mating thread of a microscope objective. Alternatively or additionally, provision can also be made that the holding component is configured at least in part as a threaded ring.

Alternatively or in addition to a threaded connection, the connecting element can be configured as a clamping connecting element or as a latching connecting element. For example, the housing of the microscope objective can comprise a circumferential latching groove into which one or more latching lugs of the mirror device engage.

Regardless of the nature of the connecting element and the manner in which the mirror device is mounted on the microscope objective, it is particularly advantageous if means are present which ensure that the mirror device is attached in the position that is respectively necessary for optical reasons. In particular, tor example, a mounting stop or several mounting stops can be present, which define a mounting position for the mirror device relative to the microscope objective, so that upon mounting of the mirror device the user does not him- or herself need to find that mounting position and align it.

Advantageously, however, provision can also be made that the mirror device mounted on the microscope objective is movable relative to the microscope objective, in particular in a Z direction.

In a particularly advantageous embodiment the rotational position relative to the microscope objective in which the mirror device is mounted can be adjusted by the user. This is advantageous in particular in terms of allowing individual adjustment of the alignment of the deflection mirror, in particular the position in a plane perpendicular to the optical axis. Alternatively or additionally, provision can also be made, in the context of an arrangement for illuminating a sample, that the microscope objective, or at least that component of the objective on which the mirror device is mounted, can be rotated around the optical axis together with the mirror device so that the rotational position of the deflection mirror or the several deflection mirrors that can be mounted on the holding component can be established individually.

In an advantageous embodiment the holding component comprises a receptacle in and/or on which the at least one deflection mirror is mounted, the receptacle comprising at least one stop that defines an unequivocal mounting position of the deflection mirror. The advantage of this embodiment is in particular that secure and reliable mounting of the deflection mirror on the holding component is made possible, for example after replacement of the deflection mirror. The user can even leave the holding component in its installed position on the microscope objective, if that is advantageous for his or her experiment or investigation.

In very particularly advantageous fashion, provision can be made that a receptacle for the deflection mirror is present on the holding component, which receptacle comprises at least one stop that, in interaction with a mating stop of the deflection mirror, defines an unequivocal mounting position of the deflection mirror. In particular, provision can advantageously be made that the receptacle is configured and arranged in such a way that the deflection mirror is automatically positioned in a predefined mounting position while it is being mounted on the holding component. With these embodiments, the user has the very particular advantage that he or she needs to concentrate only on securing the deflection mirror on the holding component, while in the course of the mounting operation the deflection mirror, so to speak, aligns itself relative to the holding component and ends up in the required mounting position.

In a very particularly advantageous embodiment, several deflection mirrors are mounted and/or mountable on the holding component. Such an embodiment has the particular advantage that the sample can be illuminated from different directions, which in turn has the advantage that even regions that are in the shadow of parts of the sample when illuminated from only one direction can be impinged upon by illuminating light by being illuminated from another direction, namely via another of the deflection mirrors.

In particular with regard to this aspect, it is particularly advantageous if several deflection mirrors located pairwise oppositely from one another are mounted on the holding component, in particular in order to allow illumination of the sample from opposite directions with reference to a projection into the X-Y plane.

In this regard, in a particularly advantageous and flexibly usable embodiment, six deflection mirrors located pairwise oppositely from one another are mounted and/or mountable on the holding component. Such an embodiment allows the "shadowing" of the samples or of parts of the samples to be influenced and/or utilized in controlled fashion.

In an advantageous embodiment, several deflection mirrors arranged in one common plane are mounted and/or mountable on the holding component. Alternatively or additionally, provision can be made that the deflection mirrors are arranged concentrically around a sample or around a target sample position.

A very particularly advantageous embodiment is one in which several deflection mirrors, which are identically constructed in terms of their mechanical construction but not obligatorily in terms of their mirror surface, are present. This has the very particular advantage that the deflection mirrors can be exchanged with one another or can also be mounted in different ones of several receptacles of the holding components.

In a very particularly advantageous embodiment, several deflection mirrors are mounted or mountable separately and mutually independently on the holding component. Such an embodiment has the very particular advantage that the user can individually decide which combination of deflection mirrors, possibly of different types, he or she wishes to mount in which receptacles of the holding component. In particular, the user can replace one of the deflection mirrors without having this influence another of the deflection mirrors.

All embodiment in which several deflection mirrors are mounted and/or mountable on the holding component, at least two mutually adjacent deflection mirrors being at an angle of 45 degrees with respect to one another, and/or the orthogonal projections of at least two mutually adjacent deflection mirrors onto a plane perpendicular to the axial direction being at an angle of 45 degrees, is particularly universally usable and also particularly advantageous, including with regard to the above-described problem, of shadowing.

Advantageously, the holding component of the mirror device can comprise several receptacles each for a deflection mirror. Provision can advantageously be made in this context that the several receptacles are identically configured, which has the very particular advantage that, as already described, the deflection mirrors can be used arbitrarily in different receptacles and in different combinations, in particular if they are configured identically in terms of their mechanical construction (but not obligatorily in terms of their mirror surface).

In order to enable an arrangement of deflection mirrors located pairwise oppositely from one another, provision can advantageously be made in particular that the holding component comprises several receptacles, located pairwise oppositely from one another, each for a deflection mirror. In particular, provision can advantageously be made that the holding component comprises six receptacles, located pairwise oppositely from one another, each for a deflection mirror.

As has likewise already been described with reference to the arrangement of the deflection mirrors, provision can also be made with regard to the receptacles that the holding component comprises several receptacles arranged in one common plane, each for a deflection mirror, and/or that the holding component comprises several receptacles each for a deflection mirror, the deflection mirrors being mounted or mountable separately and mutually independently in and/or on the receptacles, and/or that the holding component comprises several receptacles, at least two mutually adjacent receptacles being at an angle of 45 degrees with respect to one another, or the orthogonal projections of at least two mutually adjacent receptacles onto a plane perpendicular to the axial direction being at an angle of 45 degrees.

A mirror device of this kind to which several deflection mirrors are attached has the further advantage that several light bundles, for example an illuminating light bundle and a manipulating light bundle, can be directed onto the sample simultaneously or concurrently, each via one of the several deflection mirrors. Alternatively or additionally, it is also possible to direct an illuminating light bundle and/or a manipulating light bundle successively, with the aid of an adjustable beam deflection device, onto different ones of the deflection mirrors in order to illuminate or manipulate the sample from different directions.

In particular in this context, but also quite generally, with the aid of the mirror device a sample can be manipulated using manipulating light, the sample being imaged by means of SPIM technology with illumination using illuminating light, in particular excitation light for fluorescence excitation, in the form of an illuminating light sheet. Provision can be made in this context in particular that both the manipulating light and the illuminating light are focused through the same objective which is arranged in a working objective position, or through different objectives that are brought successively into a working objective position; and that the manipulating light and/or the illuminating light, after passing through the objective, is deflected by means of the mirror device in such a way that it propagates at an angle differing from zero degrees with respect to the optical axis of the objective, Light of a wide variety of wavelengths can be used for manipulation of the sample. Ultraviolet (UV) light is a highly energetic light that can be used, for example, for cell ablation, DNA cutting, and microsectioning. Usual wavelengths of 405 nm can also be used, however, for photoactivation and photoconversion, Visible (VIS) light can be used for experiments involving bleaching of fluorescent dyes (fluorescent recovery after photobleaching, FRAP). Visible light can likewise be used, however, for photoactivation and photoconversion. Using infrared (IR) light, damage can be introduced in highly controlled, very low-impact, locally limited fashion by abruptly raising the temperature, for example a water temperature, within a very small volume by impingement with infrared light. Direct absorption by tissue is also possible. IR light can also be used in conjunction with optical tweezers. Infrared manipulating light can furthermore be used for the processes already described above, such as cell ablation, photobleaching, photoactivation, and photoconversion, by the fact that the biological structures interact with the infrared manipulating light using the multiphoton (MP) excitation principle.

Advantageously, the present invention, in contrast to apparatuses known from the existing art, makes it possible in particular to manipulate a sample even from considerably more than only two directions when necessary. Using an adjustable beam deflection apparatus, for example (e.g. two galvanometer mirrors connected in series, one of which deflects in an X direction and one in a Y direction), manipulations can be performed using spot, linear, and freely selectable planar manipulating illumination. It is possible in particular to manipulate sample regions (regions of interest, ROIs) of any shape in controlled fashion by the application of manipulating light.

In a particular embodiment the holding component comprises several receptacles, in and/or on each of which a deflection mirror is mounted or mountable, each receptacle comprising at least one stop that defines an unequivocal mounting position for a deflection mirror. In particular, provision can advantageously be made that the holding component comprises several receptacles, in and/or on each of which a deflection mirror is mounted or mountable, each receptacle comprising at least one stop that, in interaction with a mating stop of a deflection mirror, respectively defines an unequivocal mounting position of the deflection mirror. As already indicated above, it is particularly advantageous if the holding component comprises several receptacles that are configured and arranged in such a way that while a deflection mirror is being mounted in and/or on one of the receptacles, said mirror is automatically positioned in a mounting position predefined for that receptacle, since the user does not him- or herself need to readjust the deflection mirror that is being mounted but rather said mirror proceeds automatically into the required mounting position in the context of a mounting operation.

The deflection mirror can be mounted on the holding component, for example, with at least one screw. Provision can be made in particular that the deflection mirror comprises a mounting opening through which proceeds a mounting screw that is screwed into a mounting thread of the holding component. An embodiment of this kind permits quick and reliable mounting and, if necessary, quick and efficient replacement of the deflection mirror with no need for a complex special tool.

As already mentioned, there are no limitations, in particular no manufacturing-related limitations, with regard to the mirror surface. Instead, all usual methods for the manufacture of mirror surfaces can be used. For example, the deflection mirror or at least one of the several deflection mirrors can comprise the dielectric mirror surface. Such an embodiment has the very particular advantage that particularly high reflectance for specific wavelengths, and/or particularly low reflectance for other wavelengths, can be achieved.

It is also possible, for example, for the deflection mirror or at least one of the several deflection mirrors to comprise a metal mirror surface, or for the deflection mirror or at least one of the several deflection mirrors to comprise an optically polished mirror surface.

There are also no fundamental restrictions in terms of the shape of the mirror surface. For example, the deflection mirror can be of flat configuration. It is also possible, however, for the deflection mirror to be curved, for example if additional focusing is desired.

In a very particularly advantageous embodiment, the mirror device comprises at least one opening through which a sample is transferable into an investigation position and/or removable from an investigation position. In particular, provision can advantageously be made that the mirror device comprises at least one opening through which a sample is transferable into an investigation position and/or removable from, an investigation position, the opening defining a transport path that proceeds in a direction different from zero degrees, in particular at an angle of 90 degrees, with respect to the axial direction and/or to the optical axis of a microscope objective on which the mirror device is mounted.

Such embodiments have the very particular advantage that a sample, for example including for multiple investigations in which samples are arranged in a row along a straight, can be brought in the X-Y plane, for example by means of a sample stage displaceable in an X-Y direction, into an investigation position between the deflection mirrors with no need for the mirror device, and/or the microscope objective together with the mirror device attached thereto, to be moved in the Z direction. This has the very particular advantage, for example, that once a focus has been established it is retained even if the sample is changed.

In particular, provision can advantageously be made that the mirror device comprises two openings located oppositely from one another, in particular in a radial direction, through which a sample is transferable into an investigation position and/or removable from an investigation position. An embodiment of this kind has the particular advantage that a first sample can be removed from the investigation position through one of the openings, while simultaneously the next sample is transferred into the investigation position through the other of the openings.

In a particularly advantageous embodiment, the holding component and/or the deflection mirror and/or at least one of several deflection mirrors, in particular all the deflection mirrors, are produced from a corrosion-resistant material and/or from a material that is inert with respect to aqueous nutrient media and/or from stainless steel. An embodiment of this kind has the very particular advantage that the mirror device is not damaged during use, for example by the liquids used in the experiment such as nutrient solutions or immersion oils or other chemicals.

An optical apparatus, which comprises a microscope objective and a mirror device according to the present invention which is mounted on the microscope objective, is particularly advantageous. Provision can be made in this context, particularly advantageously, that the plane of the mirror surface of the deflection mirror is oriented at an angle in the range from 30 to 60 degrees, in particular at an angle of 45 degrees, with respect to the optical axis of the microscope objective. Such an embodiment is suitable in particular for deflecting a light band and/or an illuminating light bundle and/or a manipulating light bundle in such a way that after deflection, it proceeds transversely to the optical axis and/or that the deflected light band propagates at an angle different from zero degrees, in particular at an angle greater than 10 degrees, very particularly at a right angle, with respect to the optical axis of the illumination objective and/or of the detection objective. Provision can in particular be made, advantageously, that the mirror device comprises several deflection mirrors, the plane of the mirror surface of each deflection mirror being respectively oriented at an angle in the range from 30 to 60 degrees, in particular at an angle of 45 degrees, with respect to the optical axis of the microscope objective.

An arrangement for illuminating a sample in the context of SPIM microscopy, having at least one light source for generating an illuminating light bundle, having means for generating a light band from the illuminating light bundle, having an illumination objective for focusing the light band, having a detection objective through which the detected light emerging from an illuminated sample proceeds, a mirror device according to the present invention, which deflects the light band emerging from the illumination objective to a sample being investigated, being mounted on the illumination objective or on the detection objective, is particularly advantageous. Provision can advantageously be made in this context, in particular, that the deflected light band is focused in the sample.

Also particularly advantageous is a microscope, in particular a SPIM microscope, that contains a mirror device according to the present invention and/or an optical apparatus according to the present invention and/or an optical arrangement according to the present invention. The microscope can be constituted in least in part by a scanning microscope or a confocal scanning microscope. In this context, in particular, a non-descan detector (NDD) that is possibly present in any case can be used as a transmitted light detector and/or used as a SPIM detector, in particular when the NDD is configured as an area detector. In addition, an adjustable beam deflection device that is present in any case in a scanning microscope can be used to direct a light band and/or an illuminating light bundle and/or a manipulating light bundle alternatingly onto one of several of the deflection mirrors.

The mirror device according to the present invention is not limited to SPIM applications in terms of its use. The mirror device according to the present invention can instead also be used for other optical investigations and/or experiments in which a light bundle is intended to proceed transversely to the optical axis. For example, it is also possible to carry out a projection tomography investigation, in which a sample is illuminated with an illuminating light bundle and in which a transmitted light bundle, which contains the light of the illuminating light bundle transmitted through the sample, is detected with a transmission detector. In this context, once the illuminating light bundle has passed through the objective it is deflected with the mirror device in such a way that after deflection it propagates at an angle different from zero degrees with respect to the optical axis of the objective and/or with respect to the sample being investigated.

The subject matter of the invention is depicted schematically and by way of example in the drawings and will be described below with reference to the Figures, identical or identically functioning elements usually being labeled with the same reference characters.

In the drawings:

DETAILED DESCRIPTION OF THE PREFERRED EMBODIMENTS

Figure 1:
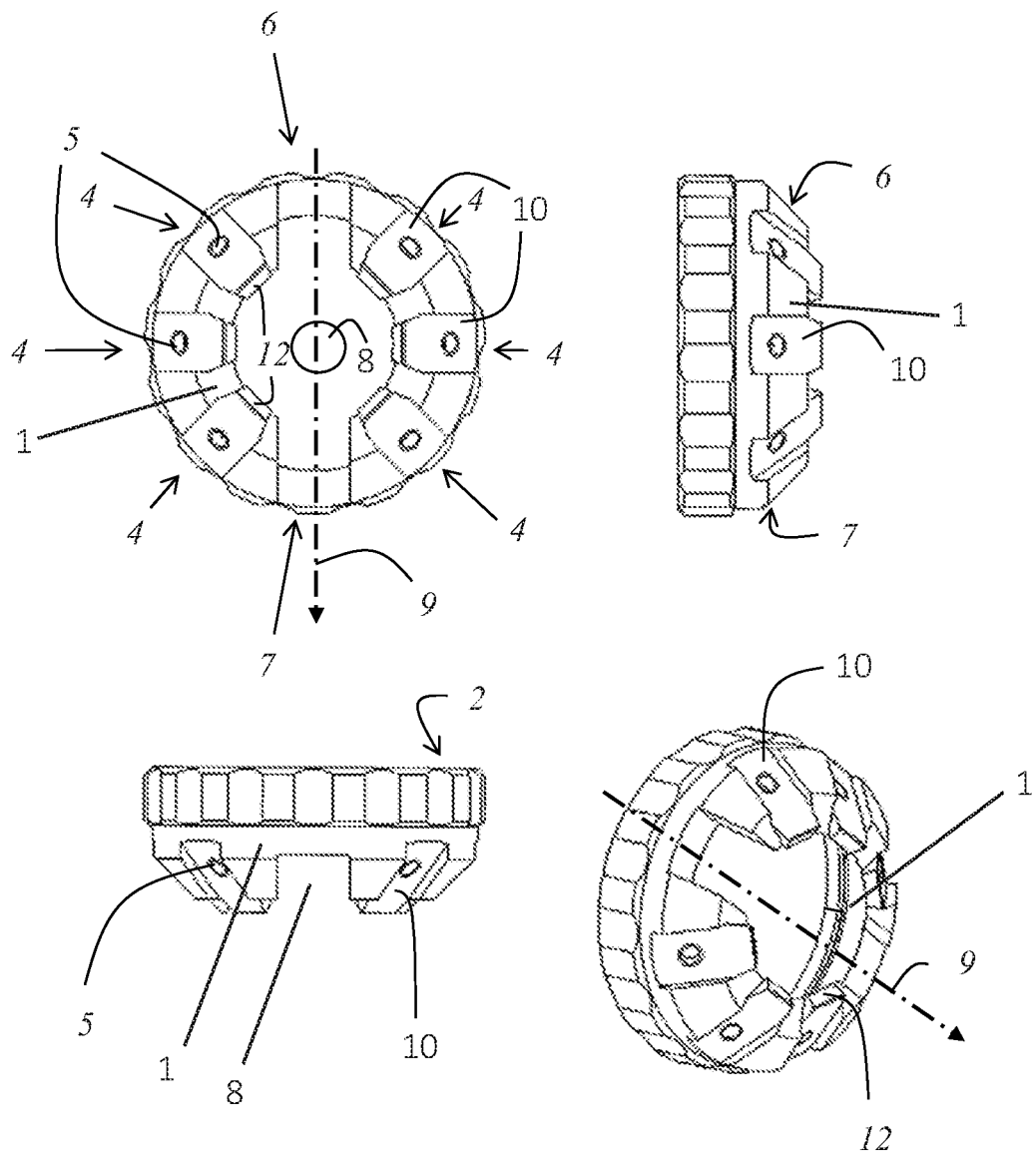
FIG. 1 shows, in several side views and a perspective depiction, the holding component of an exemplifying embodiment of a mirror device according to the present invention.

FIG. 1 shows, in several side views and a perspective depiction, holding component 1 of an exemplifying embodiment of the mirror device according to the present invention. Holding component 1 is of annular configuration and comprises a connecting element 2, namely an internal thread 3, for mounting holding component 1 on a microscope objective. Holding component 1 is configured and intended to be mounted on a microscope objective coaxially with the optical axis in terms of its axial direction. Internal thread 3 is configured and intended to form a threaded connection with the external thread of a microscope objective.

Holding component 1 comprises six receptacles 4, located pairwise oppositely from one another, on each of which a deflection mirror is mountable. Each deflection mirror is mounted on holding component 1 with a screw 20. Each deflection mirror 10 has for this purpose a mounting opening 16 through which a mounting screw, which is screwed into a mounting thread 5 of holding component 1, can pass.

Holding component 1 comprises a first opening 6 and a second opening 7 through which a sample is transferable into an investigation position 8 and removable from an investigation position 8, transport path 9 extending at an angle of 90 degrees with respect to the axial direction and/or to the optical axis of a microscope objective on which the mirror device is mounted.

Each receptacle 4 comprises a first stop 11 and a second stop 12, which define an accurate mounting position for each deflection mirror and are intended to interact with mating stop surfaces 14, 15 of deflection mirrors 10.

Figure 2:
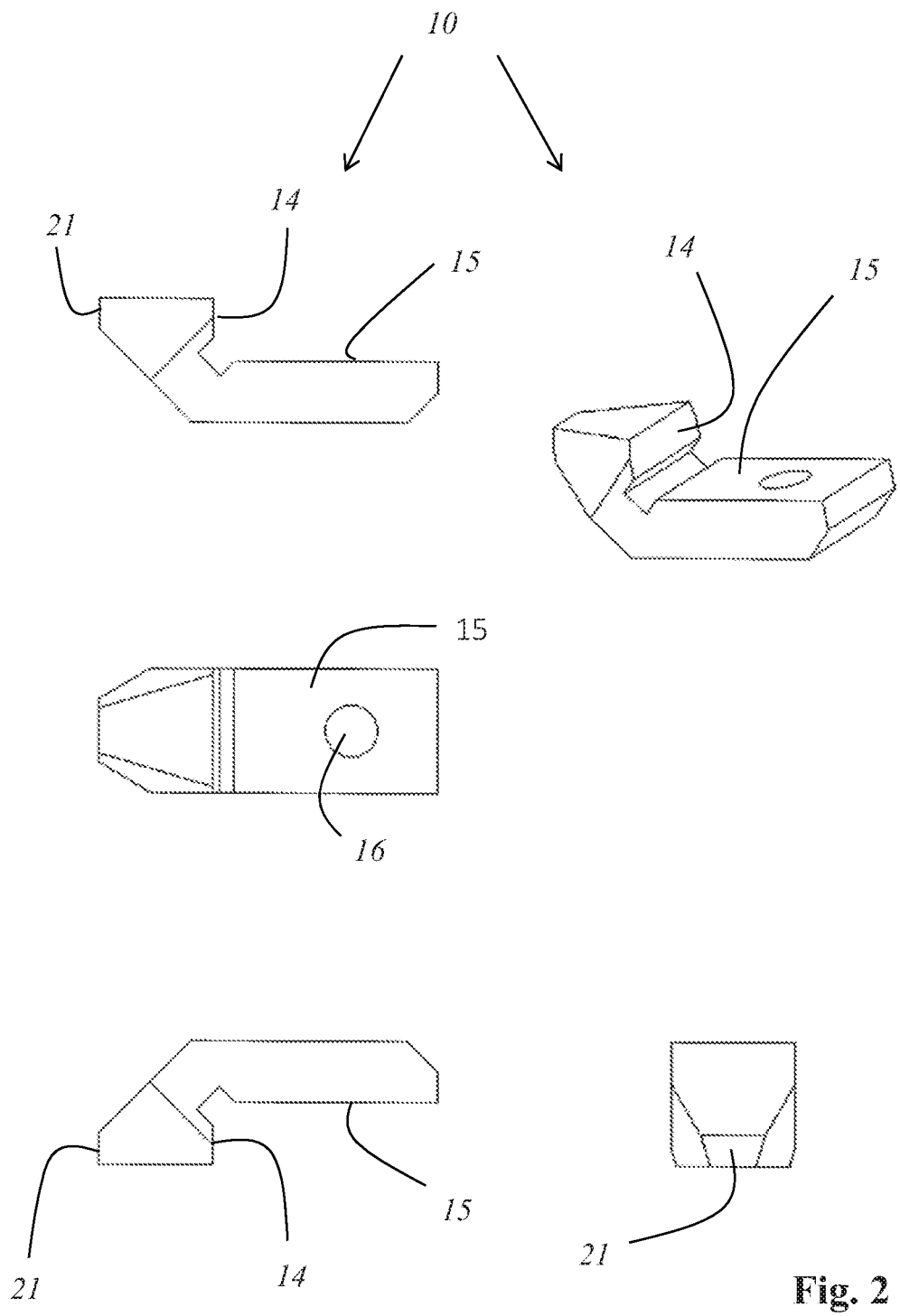
FIG. 2 shows, in several views, a deflection mirror of the mirror device.

FIG. 2 shows, in several views, a deflection mirror 10. Deflection mirror 10 comprises a mirror surface 21. Deflection mirror 10 furthermore comprises a first mating stop surface 14 and a second mating stop surface 15 that, in interaction with stop surfaces II, 12 of the holding component, ensure exact mounting of deflection mirrors 10 in terms of position.

Figure 3:
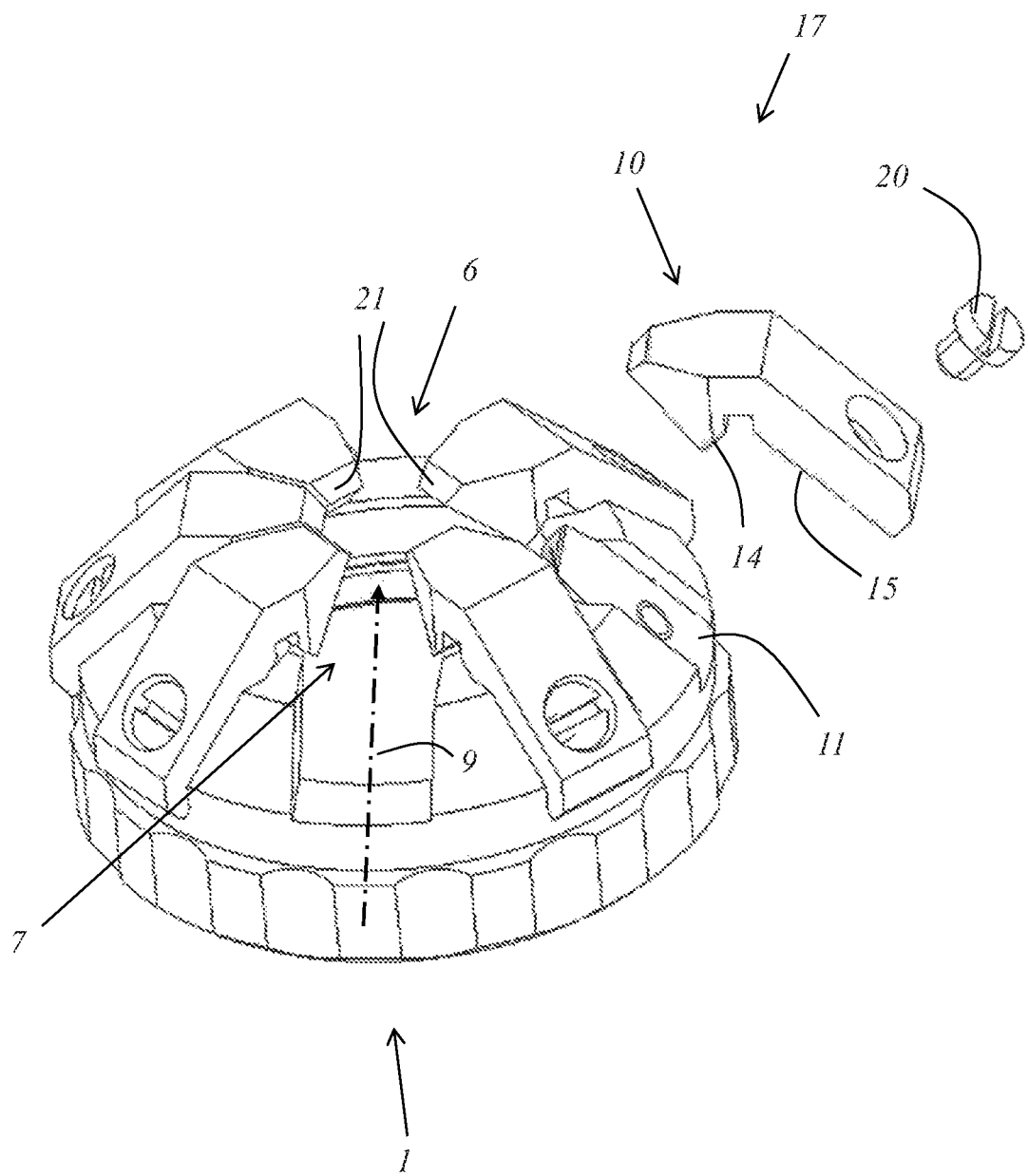
FIG. 3 is a perspective depiction of the exemplifying embodiment of the mirror device.

FIG. 3 is a perspective depiction of an exemplifying embodiment of mirror device 17, which encompasses holding component 1 depicted separately in FIG. 1 and six deflection mirrors 10 mounted thereon.

Figure 4:
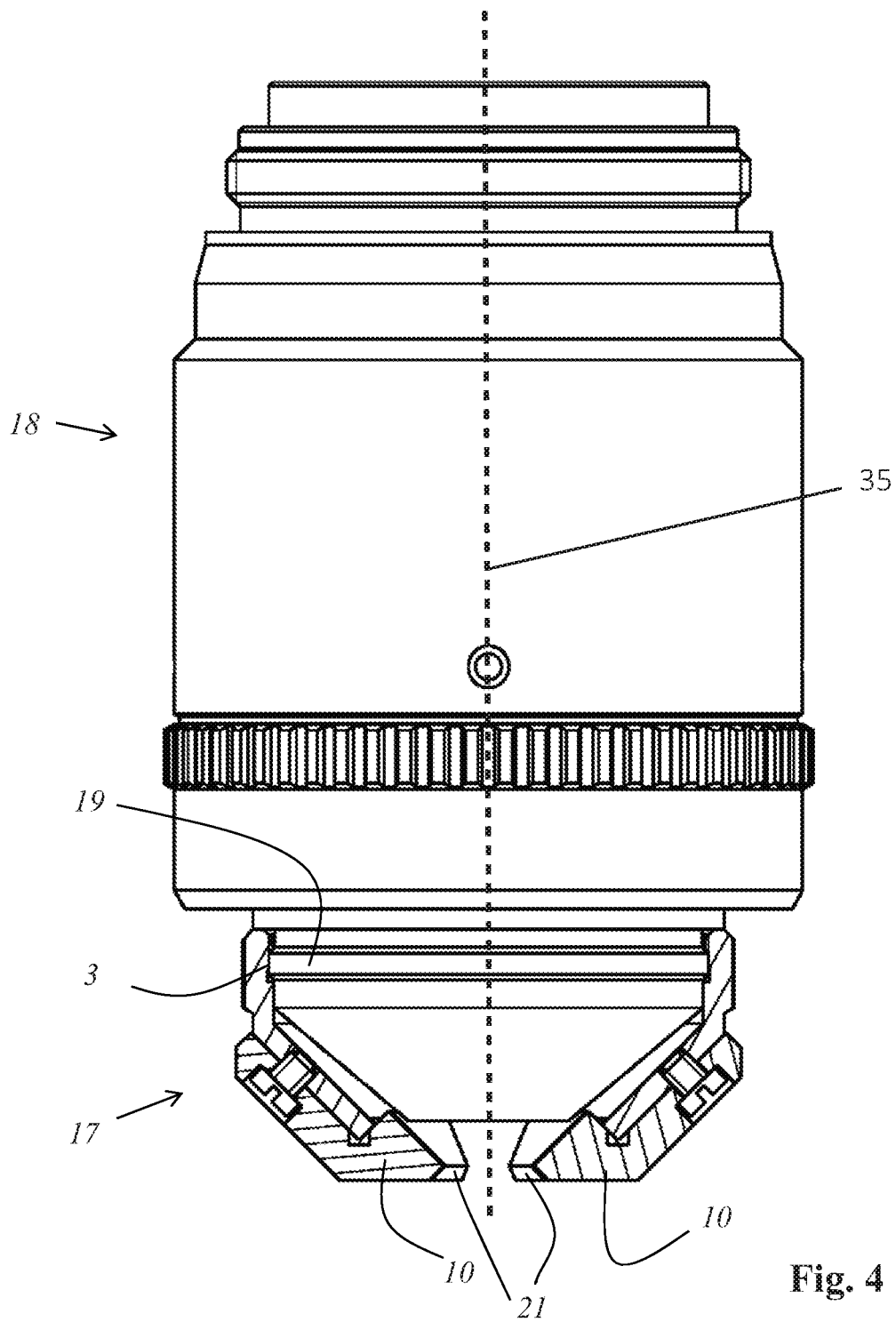
FIG. 4 is a sectioned depiction of an exemplifying embodiment of an optical apparatus according to the present invention having a microscope objective and a mirror device, mounted thereon, having six deflection mirrors.
Figure 5:
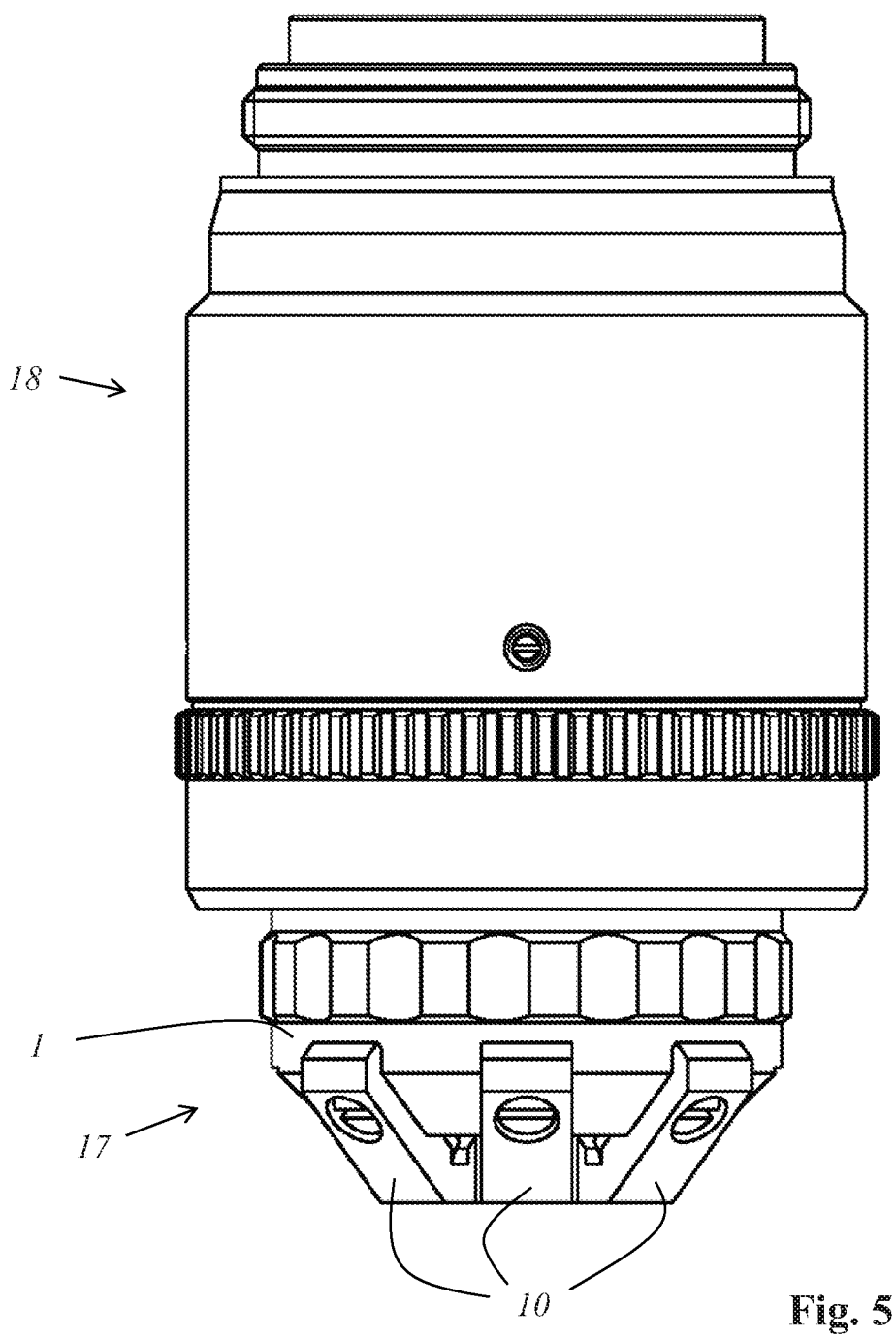
FIG. 5 is a first side view of the exemplifying embodiment of the optical apparatus.

FIG. 4 is a sectioned depiction of an exemplifying embodiment of an optical apparatus according to the present invention having a microscope objective 18 with an optical axis 35 and a mirror device 17 mounted thereon. Microscope objective 18 comprises an external thread 19 that interacts with internal thread 3.

Figure 6:
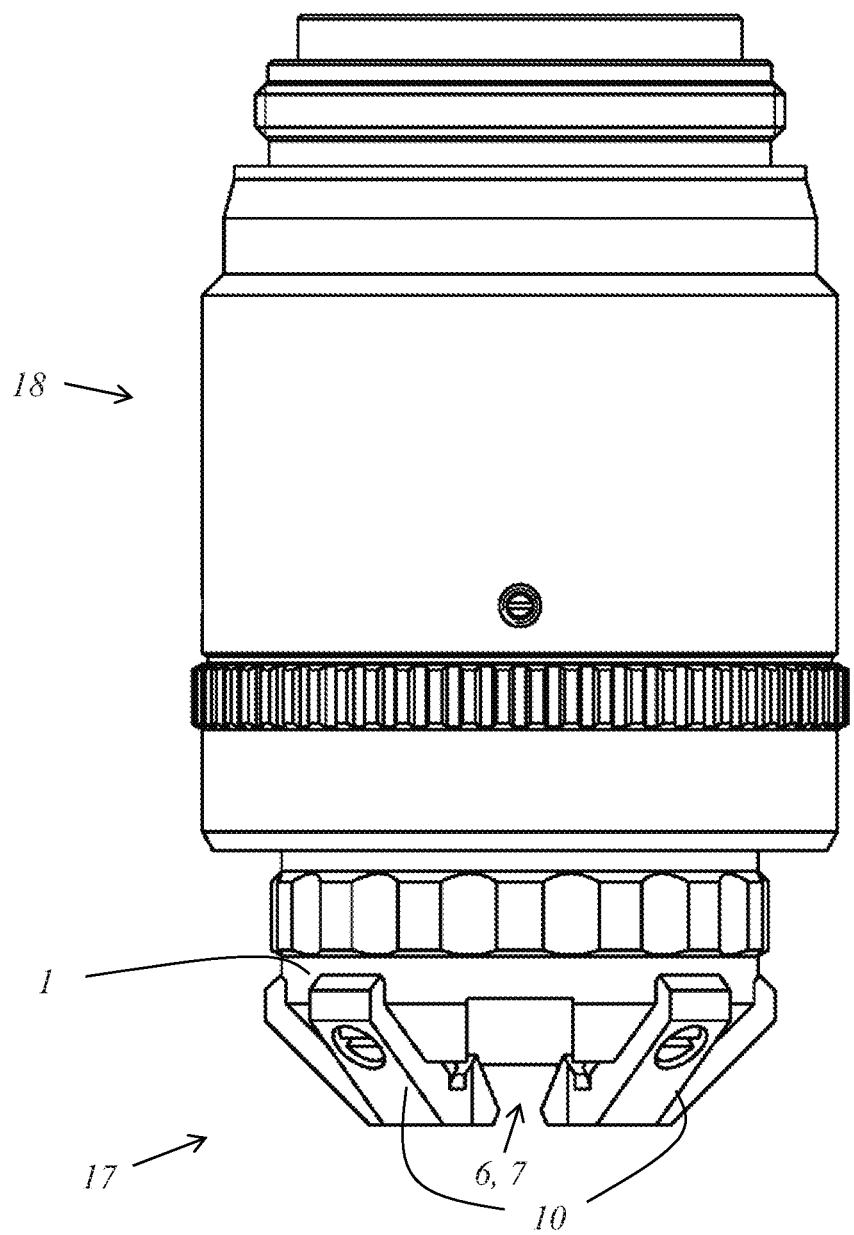
FIG. 6 is a second side view of the exemplifying embodiment of the optical apparatus.
Figure 7:
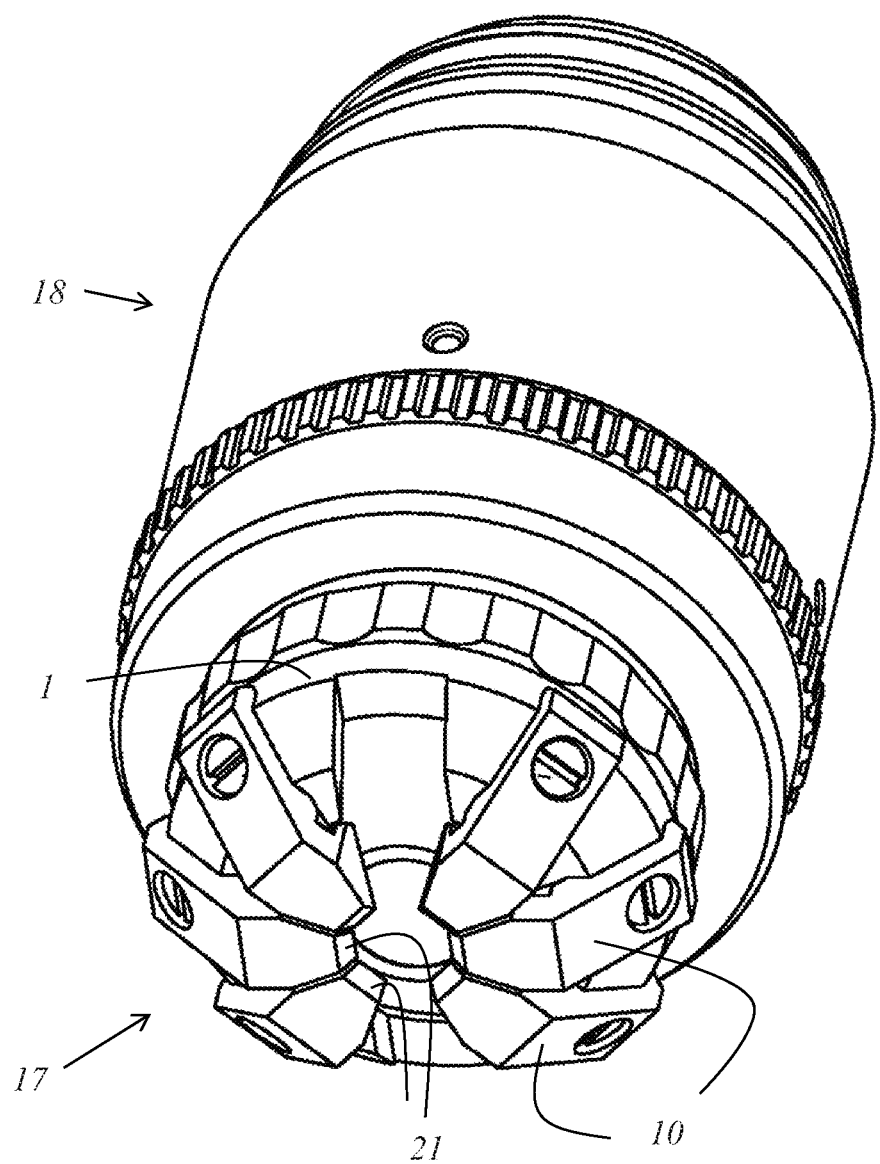
FIG. 7 is a perspective view of the exemplifying embodiment of the optical apparatus.
Figure 8:
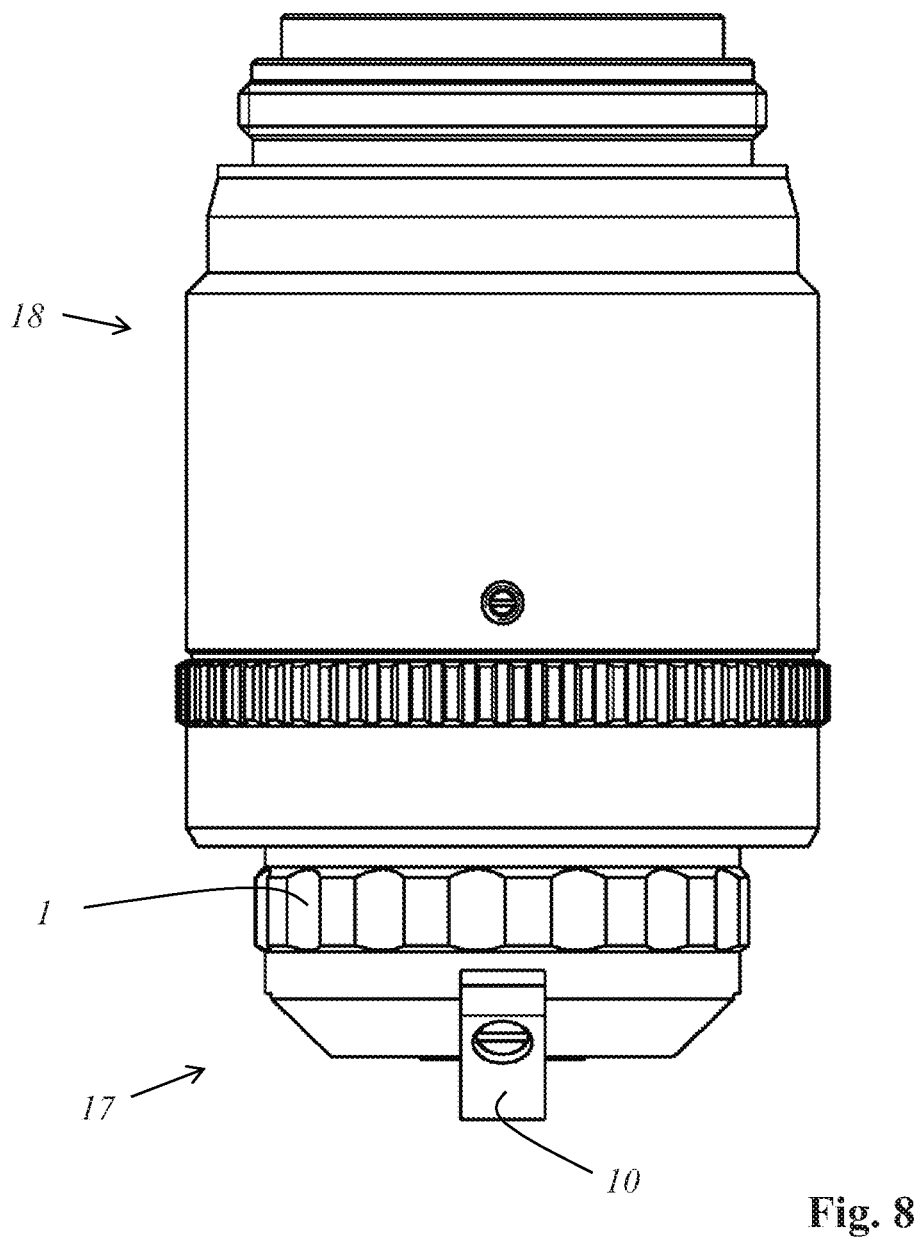
FIG. 8 is a first side view of a further exemplifying embodiment of an optical apparatus according to the present invention having a microscope objective and a mirror device, mounted thereon, having two deflection mirrors.
Figure 9:
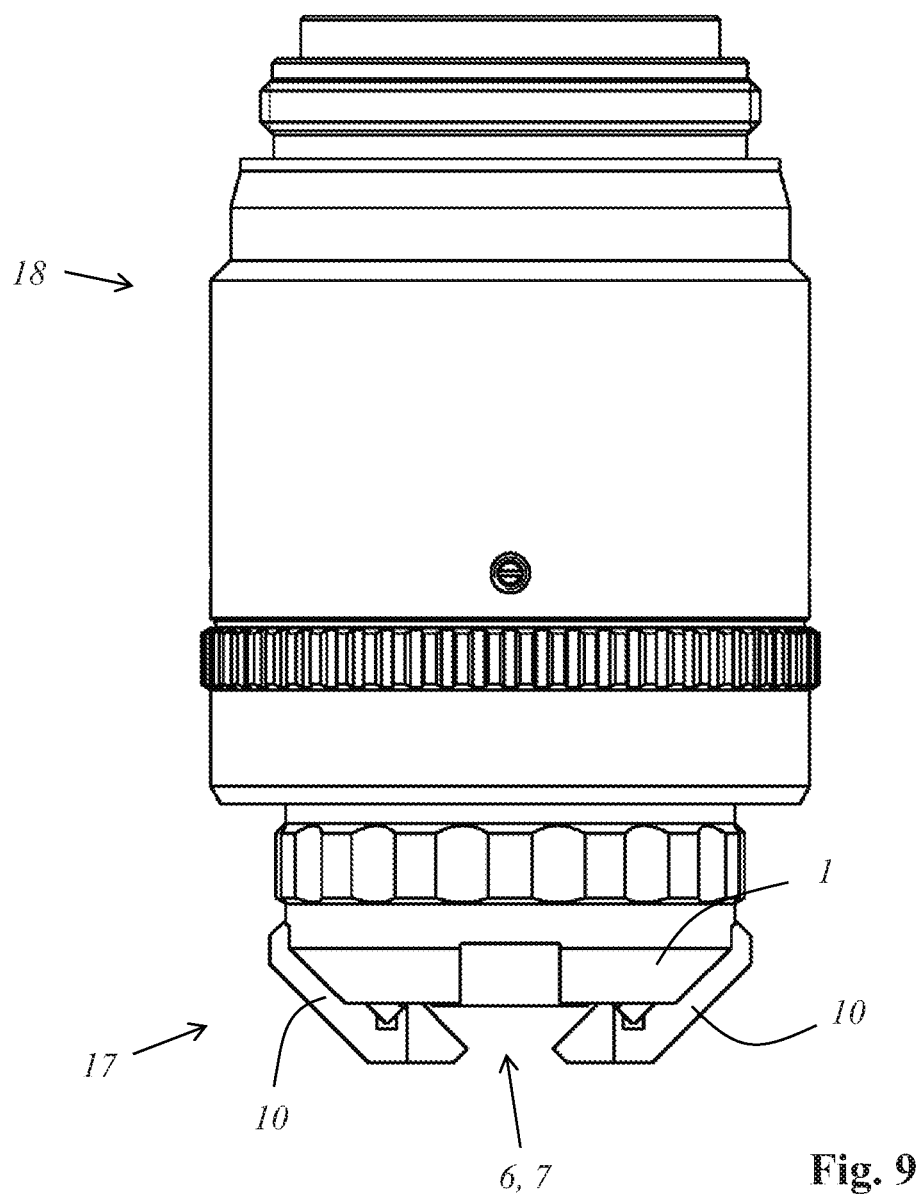
FIG. 9 is a second side view of the further exemplifying embodiment of the optical apparatus.

FIG. 6 is a side view of the exemplifying embodiment of the optical apparatus, in which openings 6, 7 for transferring a sample into and out of an investigating position are visible. The same is true analogously for the exemplifying embodiment depicted in FIG. 9, having two deflection mirrors.

Figure 10:
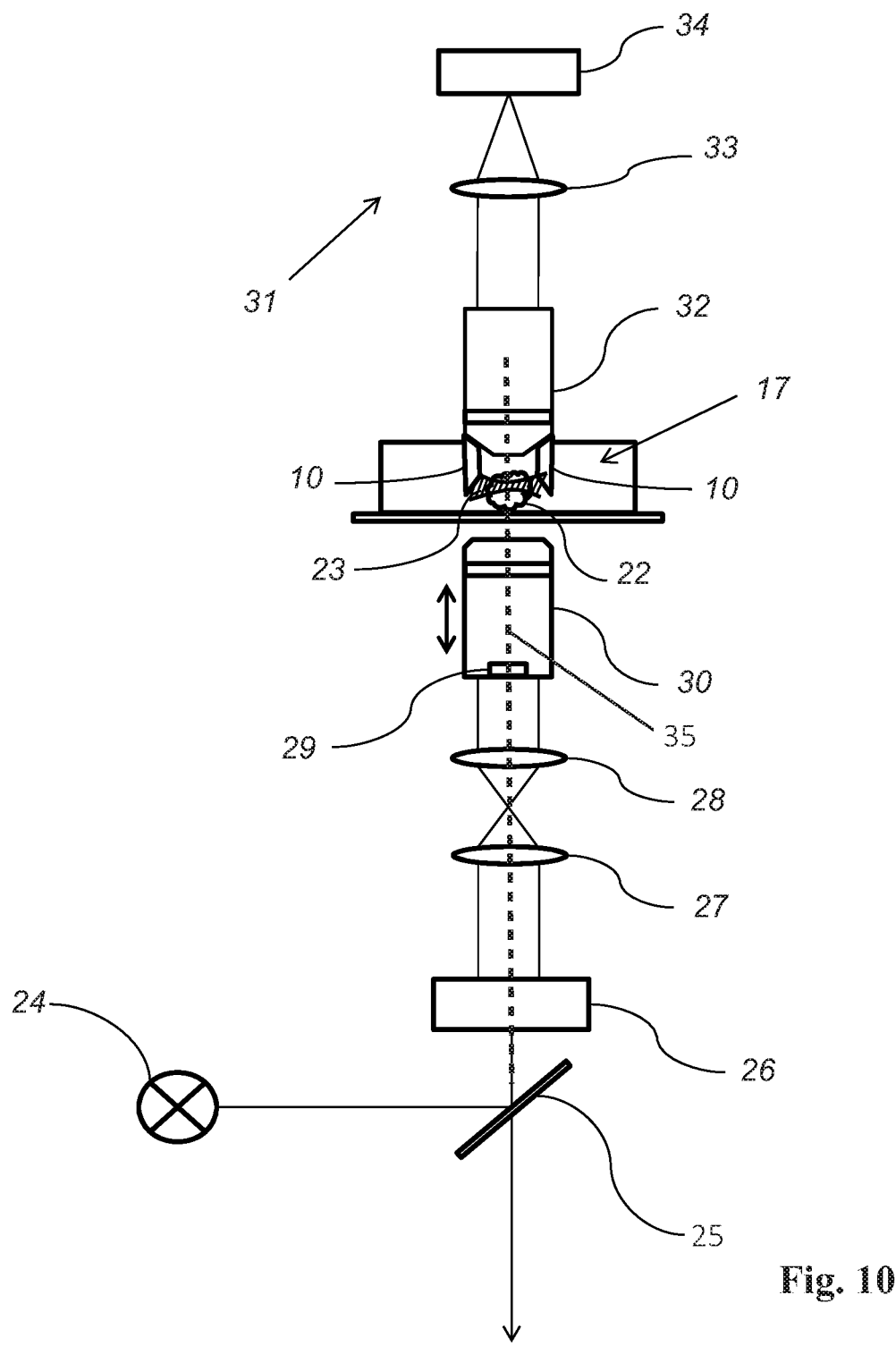
FIG. 10 shows an exemplifying embodiment of a microscope according to the present invention.

FIG. 10 shows an exemplifying embodiment of a microscope according to the present invention that is configured both for manipulating a sample 22 and for imaging a sample using SPIM technology with illumination using illuminating light, in particular excitation light for fluorescence excitation, in the form of an illuminating light sheet 23. The illuminating light is generated by a light source (not depicted) and travels through a beam splitter 25 to an adjustable beam deflection apparatus 26 and then passes via a scanning lens 27 and a tube lens 28 through entrance pupil 29 of an illumination objective 30, arranged in a working objective position, which focuses the illuminating light. After passing through illumination objective 30 the illuminating light is deflected, by means of a mirror device 17 that has deflection mirrors 10, in such a way that it propagates at an angle different from zero degrees with respect to the optical axis 35 of objective 30.

Beam deflection apparatus 26 can be configured in particular to deflect incident light mutually independently in two different directions (in particular, an X direction and a Y direction). For example, beam deflection apparatus 26 can contain two galvanometer mirrors whose rotation axes are arranged in mutually perpendicular planes. Alternatively, beam deflection apparatus 26 can also comprise, for example, a gimbal-mounted mirror.

Illuminating light sheet 23, which is depicted only very schematically in the FIG., is preferably a quasi-light sheet that is generated by the fact that the illuminating light emitted in the form of an illuminating light bundle from the light source (not depicted) is moved rapidly back and forth by means of beam deflection apparatus 26. A homogeneous intensity distribution can, in particular, be achieved in this manner. It is also possible, however, to create illuminating light sheet 23 by means of an astigmatic optic.

The detected light proceeding from that layer of sample 22 which is illuminated by illuminating light sheet 23 is detected using a detection apparatus 31. The detected light is collimated by means of a detection objective 32, and is then imaged by means of an optic 33 onto a detector 34 that can be configured, for example, as an area detector, in particular as a CCD camera or as a CMOS-based sensor. Detector 34 generates electrical signals that can be used (optionally after electronic processing) to depict sample 22 on a monitor. By shifting sample 22 along the optical axis 35 of objective 30 it is possible to successively obtain a stack of two-dimensional images that can be assembled into a three-dimensional image.

In this manner, for example, firstly a first image of sample 22 or at least of a sample layer or of a sample region of particular interest can be obtained, in order then to carry out (as described below) a manipulation whose effects can then once again be made visible by generating a further image.

The microscope comprises a further light source 24 that emits manipulating light. The manipulating light generated by further light source 24 is deflected by beam, splitter 25 to beam deflection apparatus 26 and then travels via scanning lens 27 and tube lens 28 to objective 30 arranged in the working objective position. Objective 30 also focuses the manipulating light. However, beam deflection apparatus 26 deflects manipulating light, unlike the illuminating light previously, not onto a deflection mirror 10 but instead in such a way that after passing through objective 30 it strikes sample 1 directly.

Care is to be taken in this context that the foci of the illuminating light and manipulating light have different positions within sample 22, so that the region previously illuminated with the focus of the illuminating light sheet cannot be manipulated with the focus of the manipulating light.

This is corrected by shifting objective 30 along the optical axis 35, as indicated in FIG. 10 by the double arrow. The displacement travel is preferably of the same magnitude as the original spacing difference of the foci relative to the objective.

PARTS LIST

1 Holding component
2 Connecting element
3 Internal thread
4 Receptacles
5 Mounting thread
6 First opening
7 Second opening
8 Investigation position
9 Transport path
10 Deflection mirror
11 First stop
12 Second stop
14 First mating stop surface
15 Second mating stop surface
16 Mounting opening
17 Mirror device
18 Microscope objective
19 External thread
20 Screw
21 Mirror surface
22 Sample
23 Illuminating light sheet
24 Light source
25 Beam splitter
26 Beam deflection apparatus
27 Scanning lens
28 Tube lens
29 Entrance pupil
30 Objective
31 Detection apparatus
32 Detection objective
33 Optic
34 Detector
35 Optical axis

What is claimed is:

1. A mirror device for deflecting illuminating light in single plane illumination microscopy, the device comprising:
    a holding component that comprises a connecting element for mounting the holding component on a microscope objective, wherein at least one deflection mirror is detachably mounted on the holding component,
    wherein the mirror device comprises at least one opening through which a sample is transferable into an investigation position and/or removable from the investigation position; and
    wherein the at least one opening defines a transport path that proceeds in a direction different from zero degrees, with respect to an axial direction and/or to an optical axis of the microscope objective on which the mirror device is mounted.

2. The mirror device according to claim 1, wherein:
    a. the holding component is of annular configuration; and
    b. the holding component is configured to be mounted on a microscope objective coaxially with the optical axis of the microscope objective.

3. The mirror device according to claim 1, wherein:
    a. the connecting element comprises an internal thread configured to form a threaded connection with a mating thread of the microscope objective; and
    b. the holding component is configured at least in part as a threaded ring.

4. The mirror device according to claim 1, wherein:
    a. the holding component comprises a receptacle for mounting the at least one deflection mirror, the receptacle comprising at least one stop that defines an unequivocal mounting position of the at least one deflection mirror; and
    b. wherein the at least one stop of the receptacle, defines the unequivocal mounting position of the deflection mirror in interaction with a mating stop of the deflection mirror; and
    c. wherein the receptacle is configured and arranged to automatically position the deflection mirror in a predefined mounting position while it is being mounted on the holding component.

5. The mirror device according to claim 1, wherein:
    a. the device comprises several deflection mirrors mounted and/or mountable on the holding component; and
    b. wherein the several deflection mirrors are located pairwise oppositely from one another; and
    c. wherein the several deflection mirrors are arranged in one common plane; and
    d. wherein the several deflection mirrors are mounted or are mountable separately and mutually independently on the holding component; and
    e. wherein, at least two mutually adjacent deflection mirrors are at an angle of 45 degrees with respect to one another, wherein orthogonal projections of the at least two mutually adjacent deflection mirrors onto a plane perpendicular to an axial direction are at an angle of 45 degrees.

6. The mirror device according to claim 5, wherein at least one of the several deflection mirrors comprises a mirror surface selected from the group consisting of a dielectric mirror surface, a metal mirror surface, and an optically polished mirror surface.

7. The mirror device according to claim 5, wherein at least one of the several deflection mirrors comprises a mirror surface selected from the group consisting of a flat mirror surface, and a curved mirror surface.

8. The mirror device according to claim 1, wherein:
   a. the holding component comprises several receptacles, each for a deflection mirror; and
   b. wherein the several receptacles are located pairwise oppositely from one another, each for a deflection mirror; and
   c. wherein the several receptacles are arranged in one common plane, each for a deflection mirror; and
   d. wherein, the deflection mirrors are mounted or mountable separately and mutually independently in and/or on the receptacles; and
   e. wherein, at least two mutually adjacent receptacles are at an angle of 45 degrees with respect to one another, or orthogonal projections of the at least two mutually adjacent receptacles onto a plane perpendicular to the axial direction are at an angle of 45 degrees.

9. The mirror device according to claim 1, wherein
   a. the holding component comprises several identically configured receptacles, in and/or on each of which a deflection mirror is mounted or is mountable; and
   b. wherein, each receptacle comprises at least one stop that defines an unequivocal mounting position for a deflection mirror; and
   c. wherein the at least one stop of the receptacle, respectively defines an unequivocal mounting position of the deflection mirror in interaction with a mating stop of the deflection mirror; and
   d. wherein the several receptacles are configured and arranged in such a way that while a deflection mirror is being mounted in and/or on one of the receptacles it is automatically positioned in a mounting position predefined for that receptacle.

10. The mirror device according to claim 1, wherein
    a. the at least one deflection mirror is mounted on the holding component with at least one screw; and
    b. wherein the at least one deflection mirror comprises a mounting opening through which proceeds the at least one screw that is screwed into a mounting thread of the holding component.

11. The mirror device according to claim 1, wherein
    a. wherein the transport path proceeds in a direction at an angle of 90 degrees, with respect to the axial direction and/or to the optical axis of the microscope objective on which the mirror device is mounted;
    b. wherein the mirror device comprises two openings located oppositely from one another in a radial direction, through which a sample is transferable into the investigation position and/or removable from the investigation position.

12. The mirror device according to claim 1, wherein the holding component and/or the at least one deflection mirror is produced from a material selected from the group consisting of a corrosion-resistant material, a material that is inert with respect to aqueous nutrient media and stainless steel.

13. An optical apparatus comprising a microscope objective and a mirror device for deflecting illuminating light in single plane illumination microscopy, the mirror device comprising:
    a holding component that comprises a connecting element for mounting the holding component on the microscope objective, wherein
    at least one deflection mirror is detachably mounted on the holding component, and
    wherein the mirror device is mounted on the microscope objective,
    wherein the mirror device comprises at least one opening through which a sample is transferable into an investigation position and/or removable from the investigation position; and
    wherein the at least one opening defines a transport path that proceeds in a direction different from zero degrees, with respect to an axial direction and/or to an optical axis of the microscope objective on which the mirror device is mounted.

14. The optical apparatus according to claim 13, wherein:
    a plane of a mirror surface of the at least one deflection mirror is oriented at an angle in a range from 30 to 60 degrees with respect to the optical axis of the microscope objective.

15. An arrangement for illuminating a sample in single plane illumination microscopy comprising:
    at least one light source for generating an illuminating light bundle;
    means for generating a light band from the illuminating light bundle;
    an illumination objective for focusing the light band;
    a detection objective through which detected light emerging from an illuminated sample proceeds;
    a mirror device comprising a holding component that comprises a connecting element for mounting the holding component, wherein at least one deflection mirror is detachably mounted on the holding component, and wherein the mirror device is mounted on the illumination objective or on the detection objective for deflecting the light band emerging from the illumination objective to a sample being investigated,
    wherein the mirror device comprises at least one opening through which a sample is transferable into an investigation position and/or removable from the investigation position; and
    wherein the at least one opening defines a transport path that proceeds in a direction different from zero degrees, with respect to an axial direction and/or to an optical axis of the objective on which the mirror device is mounted.

16. The arrangement according to claim 15, wherein the deflected light band is focused in the sample.

17. The arrangement according to claim 16, wherein the deflected light band propagates at a non-zero angle with respect to an optical axis of the illumination objective and/or of the detection objective.

18. A single plane illumination microscope comprising:
    a mirror device for deflecting illuminating light in single plane illumination microscopy, the device comprising a holding component that comprises a connecting element for mounting the holding component on a microscope objective, and wherein at least one deflection mirror is detachably mounted on the holding component;
    an optical apparatus comprising the microscope objective and the mirror device, wherein the mirror device is mounted on the microscope objective; and
    an optical arrangement comprising:
    at least one light source for generating an illuminating light bundle;
    means for generating a light band from the illuminating light bundle;
    an illumination objective for focusing the light band;

a detection objective through which detected light emerging from an illuminated sample proceeds.

19. The microscope according to claim 18 at least partially comprising a scanning microscope or a confocal scanning microscope.

* * * * *